United States Patent [19]

Roberts

[11] Patent Number: 5,628,344

[45] Date of Patent: May 13, 1997

[54] DRY DISCONNECT COUPLING INCLUDING MEANS FOR RETURNING FLUID RESIDUE TO FLOW PATH

[75] Inventor: Robert D. Roberts, Cary, N.C.

[73] Assignee: Emco Wheaton, Inc., Morrisville, N.C.

[21] Appl. No.: 443,256

[22] Filed: May 17, 1995

[51] Int. Cl.[6] ........................................ F16L 37/28
[52] U.S. Cl. ................. 137/614.06; 137/614; 137/893; 137/895
[58] Field of Search ......................... 137/614.06, 614, 137/888, 892, 893, 895

[56] References Cited

U.S. PATENT DOCUMENTS

| | | | |
|---|---|---|---|
| 4,618,171 | 10/1986 | Fahl | 285/93 |
| 4,687,016 | 8/1987 | Takahashi | 137/614.06 |
| 4,948,094 | 8/1990 | Fahl | 251/149.6 |
| 4,971,107 | 11/1990 | Yonezawa | 137/240 |
| 4,989,630 | 2/1991 | Yonezawa | 137/240 |
| 5,273,071 | 12/1993 | Oberrecht | 137/614.06 |
| 5,301,718 | 4/1994 | Bollofner | 137/893 |
| 5,407,175 | 4/1995 | Roberts et al. | 137/614.06 |

FOREIGN PATENT DOCUMENTS

| | | | |
|---|---|---|---|
| 44-24030 | 6/1969 | Japan | 137/895 |

*Primary Examiner*—A. Michael Chambers
*Attorney, Agent, or Firm*—Christopher C. Dremann

[57] ABSTRACT

A dry disconnect coupling connects the transfer hose from a fuel oil storage tank and the fill pipe of a tanker truck to form a continuous flow path between the storage tank and the tanker truck. The coupling includes an adapter, a coupler, and means for returning fuel residue to the flow path or to an external reservoir. The adapter is attached to the fill pipe of the tanker truck on one end and to the coupler on the other end. The free end of the coupler is attached to the transfer hose from the storage tank. The adapter and the coupler each define a flow passageway therethrough which is sealed by a poppet valve having an end face. The fuel returning means includes a reservoir for collecting fuel residue that accumulates on the end faces of the adapter and the coupler during transfer operations. In a preferred embodiment, the returning means includes a venturi vacuum for suctioning the fuel residue out of the reservoir and into the flow passageway defined by the coupler. In another preferred embodiment, the returning means includes aspirating and pumping means for suctioning the fuel residue out of the reservoir into a holding chamber, and then pumping the fuel residue out of the holding chamber into the flow passageway defined by the coupler.

28 Claims, 5 Drawing Sheets

DRY DISCONNECT COUPLING INCLUDING MEANS FOR RETURNING FLUID RESIDUE TO FLOW PATH

FIELD OF THE INVENTION

The invention relates to a dry disconnect coupling. More particularly, the invention relates to a dry disconnect coupling for connecting one fluid conduit to another to form a continuous flow path which includes means for returning fluid residue to the flow path.

BACKGROUND OF THE INVENTION

Dry disconnect couplings are used in various applications to connect one fluid conduit to another to form a continuous flow path. For example, dry disconnect couplings are used to form a continuous flow path between a storage tank and a tanker truck for transferring petroleum products and chemicals, such as fuel, at a storage tank farm. Typically, the dry disconnect coupling includes an adapter and a coupler. The adapter is attached to the fill pipe of a tanker truck at one end and to the coupler at the other end. The coupler is attached at its free end to a transfer hose from the storage tank. The adapter and the coupler each define a flow passageway therethrough which is sealed by a poppet valve. The poppets may be opened simultaneously by displacing the poppet of the coupler in the direction of the adapter to complete the continuous flow path.

As the fuel is transferred from the storage tank to the tanker truck, a small amount of fuel accumulates on the end faces of the poppets. After the transfer operation is completed and the coupling is uncoupled, the fuel residue on the end faces of the poppets may be spilled onto the ground in the vicinity of the coupling. Although the amount of fuel that may be spilled after each transfer operation is generally less than an ounce, repeated transfer operations can result in significant contamination of the ground. Accordingly, it is desirable to provide a dry disconnect coupling for connecting a transfer hose from a storage tank to the fill pipe of a tanker truck which includes means for returning fuel residue that accumulates on the end faces of the adapter and the coupler to the flow path or to an external reservoir.

A dry disconnect coupling is disclosed in U.S. Pat. No. 5,273,071 issued Dec. 23, 1993 to Oberrecht. The Oberrecht coupling consists of an adapter connected to a liquid conduit at one end and to a coupler at the other end. The coupler is in turn connected to another liquid conduit. The adapter and the coupler each define a flow passageway and include a poppet valve. When closed, the poppets seal the adapter and the coupler. When opened, the poppets permit liquid to flow between the conduits through the flow passageways.

The coupler of the Oberrecht coupling is provided with an O-ring mounted in a groove formed in the end face of the poppet. When the poppets are opened, the O-ring seals the end faces of the poppets to prevent the end faces from being wetted with fuel during transfer operations. The O-ring thus minimizes the amount of fuel residue that accumulates on the end faces of the poppets which could be a source of contamination when the coupling is disconnected.

Fuel residue may, however, accumulate around the periphery of the seal. The fuel residue is not returned to the flow path or to an external reservoir, but instead may travel around the periphery of the seal under the influence of gravity and collect at the bottom of the seal opposite the ground. Thus, when the coupling is uncoupled the fuel residue may spill and contaminate the ground in the vicinity of the coupling. Further, the O-ring may become worn. If not replaced, the worn O-ring may leak and permit fuel to collect on the end faces of the coupler and the adapter. Thus, the fuel residue likewise may spill when the coupling is disconnected and contaminate the surrounding ground.

SUMMARY OF THE INVENTION

In view of the noted deficiencies in the prior art it is an object of the invention to provide a dry disconnect coupling for connecting one fluid conduit to another to form a continuous flow path.

It is another object of the invention to provide a coupling which includes an adapter and a coupler defining flow passageways therethrough sealed by a poppet valve.

It is another object of the invention to provide a coupling which includes means for returning fluid residue that accumulates on the end faces of the poppets to the flow path or to and external reservoir.

It is another object of the invention to provide a coupling which reduces the amount of fluid residue that may be spilled and contaminate the surrounding ground when the coupling is disconnected.

It is another, and more particular, object of the invention to provide a dry disconnect coupling which includes novel means for returning fuel residue to the flow path or to an external reservoir.

The above and other objects and advantages of the invention are achieved in the preferred embodiments of the dry disconnect coupling illustrated and described herein. The invention is a dry disconnect coupling for connecting one fluid conduit to another to form a continuous flow path. The dry disconnect coupling includes an adapter, a coupler and means for returning fluid residue to the flow path or to an external reservoir.

The coupling is preferably a dry disconnect coupling for transferring fuel between a storage tank and a tanker truck at a storage tank farm. In a preferred embodiment, the adapter is attached to the fill pipe of the tanker truck at one end and to the coupler at the other end. The coupler is in turn attached to a transfer hose from the storage tank. Thus, the coupling connects the transfer hose to the fill pipe to form a continuous flow path between the storage tank and the tanker truck.

The adapter and the coupler each define a flow passageway therethrough which is sealed by the end face of a poppet valve. The poppets may be opened simultaneously by displacing the poppet of the coupler in the direction of the adapter. When opened, the end face of the poppet of the coupler is in contiguous relation with the end face of the poppet of the adapter.

During transfer operations, fuel residue accumulates on the end faces of the poppets. When the coupling is uncoupled, such as after a transfer operation, the fuel residue may be spilled onto the ground beneath the coupling. Accordingly, repeated transfer operations can result in significant contamination of the ground surrounding the coupling.

The returning means collects the fuel residue and returns it to the flow path. The returning means includes a reservoir formed in the coupler for collecting the fuel residue that accumulates on the end faces of the poppets. After each transfer operation, the fuel residue drains into the reservoir and is retained there until the next transfer operation.

In a preferred embodiment, the returning means includes a tube which extends between the reservoir and an opening in the coupler adjacent the poppet such that the reservoir is in fluid communication with the flow passageway of the coupler. When the poppet is opened, a small cross sectional area is formed in the flow passageway of the coupler. As fuel at high velocity passes over the opening a vacuum is created which suctions the fuel residue from the reservoir through the tube and into the flow path or an external reservoir.

In another preferred embodiment, the returning means includes aspirating and pumping means. The aspirating means includes a first tube which extends between the reservoir and a holding chamber. A first ball check valve biased by a first spring against a first valve seat seals the holding chamber. When the poppet of the coupler is opened, the aspirating and pumping means suctions the fuel residue through the first tube behind the first check valve and into the holding chamber.

The aspirating and pumping means also includes a second tube which extends between the holding chamber and an opening in the coupler. A second ball check valve biased by a second spring against a second valve seat seals the second tube. When the poppet of the coupler is closed, the fuel residue held in the holding chamber is pumped past the second check valve through the second tube and into the flow path or into an external reservoir.

The returning means reduces the amount of fuel residue that may be spilled on the ground beneath the coupling. Thus, the likelihood that the ground surrounding the coupling will be contaminated by fuel residue is decreased.

BRIEF DESCRIPTION OF THE DRAWINGS

The foregoing and other objects, advantages and features of the invention will become readily apparent in view of the following detailed description in conjunction with the accompanying drawings which illustrate preferred embodiments of the invention, and in which.

DETAILED DESCRIPTION OF THE PREFERRED EMBODIMENTS

Figure 1:
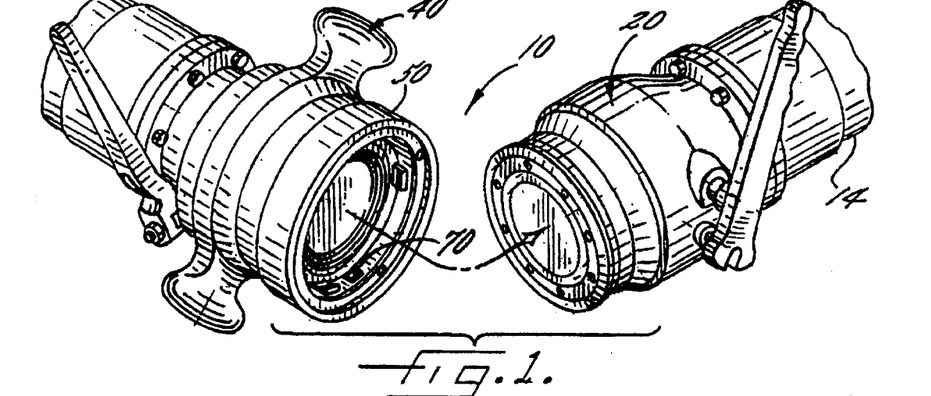
FIG. 1 is a perspective view of a dry disconnect coupling according to the invention showing the coupler and the adapter disconnected.

Referring to the accompanying drawings, FIG. 1 illustrates a dry disconnect coupling, indicated generally at 10, according to the invention. The coupling 10 connects one fluid conduit to another to form a continuous flow path. Preferably, the coupling 10 is a Dry-Break™ coupling manufactured by Emco Wheaton DMT, Morrisville, N.C. for connecting the transfer hose 12 of a storage tank and the fill pipe 14 of a tanker truck at a fuel storage tank farm to form a continuous flow path between the storage tank and the tanker truck. Coupling 10 comprises an adapter 20, a coupler 40 and means 70 for returning fuel residue to the flow path or to an external reservoir.

Figure 2:
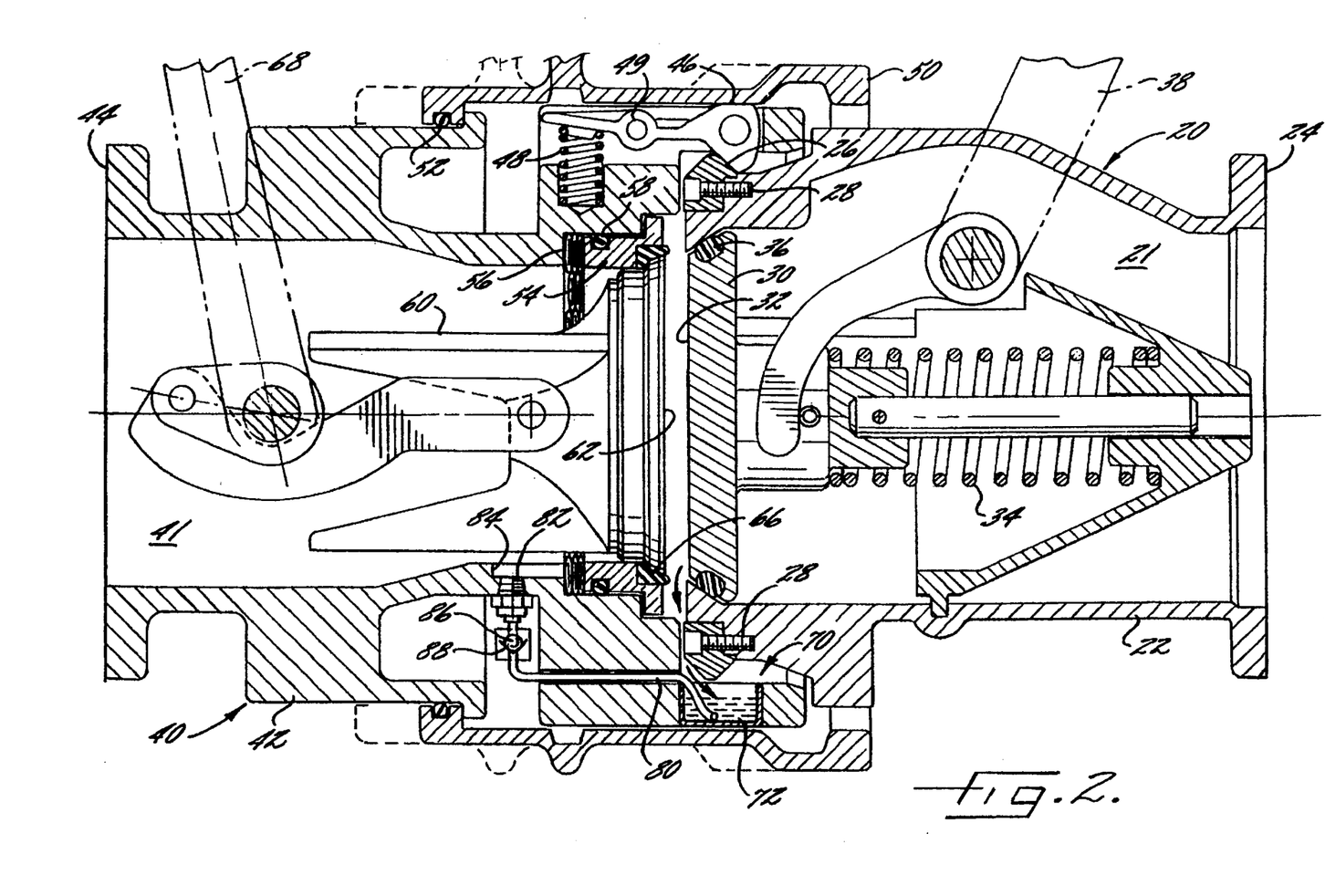
FIG. 2 is a sectional view of the coupling of FIG. 1 showing the adapter attached to the coupler and the poppets of the adapter and the coupler closed.

As best shown in FIG. 2, adapter 20 comprises a generally cylindrical body 22 defining a flow passageway 21 therethrough. Body 22 comprises a flange 24 for attaching one end of the adapter 20 to the fill pipe 14 of the tanker truck. An annular flange 26 for attaching the other end of the adapter 20 to the coupler 40 is secured to the body 22 with screws 28. Flange 26 is described in detail in U.S. Pat. No. 5,407,175 issued Apr. 18, 1995 to Roberts et al. and assigned to the present assignee, the disclosure of which is incorporated herein.

Adapter 20 further comprises a poppet valve 30 for sealing the flow passageway 21. Poppet 30 comprises an end face 32 biased by a spring 34 against body 22 at the end of the adapter 20 which is attached to the coupler 40. An annular valve seal 36 seals the end face 32 of the poppet 30 and the inner surface of body 22 of the adapter 20 when the poppet is closed. Poppet 30 is provided with a lever 38 for opening the poppet against spring 34 to permit fuel to flow through flow passageway 21 in the direction of coupler 40, such as, for example when emptying fuel from the tanker truck.

Coupler 40 likewise comprises a generally cylindrical body 42 defining a flow passageway 41 therethrough. Body 42 comprises a flange 44 for attaching the free end of the coupler 40 to the transfer hose 12 of the storage tank. A plurality of circumferentially-spaced latching lugs 46 are biased by springs 48 about pivot 49 for engaging the far side of flange 26 to attach coupler 40 to adapter 20. The latching lugs 46 are secured on flange 26 by annular locking sleeve 50. Locking sleeve 50 is movable relative to body 42 such that the sleeve may be moved forward over the latching lugs 46 and retained in frictional relation therewith. A dust seal 52 may be used to prevent foreign particulate matter from collecting between locking sleeve 50 and body 42 of coupler 40 and interfering with the smooth operation of the locking sleeve.

Coupler 40 likewise further comprises a poppet valve 60 for sealing the flow passageway 41. Popper 60 comprises an end face 62 which is positioned opposite the end face 32 of poppet 30. An annular seal ring 54 separates the poppet 60 and the inner surface of body 42. Ring 54 is biased by a wave spring 56 against the inner edge of the end face 62 of poppet 60 such that ring 54 moves with the poppet relative to body 42. O-ring 58 seals ring 54 and body 42 of coupler 40. An annular valve seal 66 seals ring 54 and the inner edge of the end face 62 of the poppet 60 when the poppet is closed.

Popper 60 is provided with a lever 68 for displacing the poppet in the direction of the adapter 20. As the poppet 60 is displaced in the direction of adapter 20, ring 54 moves forward with poppet 60 a predetermined distance under the influence of wave spring 56°. Displacing poppet 60 in the direction of adapter 20 positions end face 62 in contiguous relation with end face 32 and compresses spring 34 to permit fuel to flow through flow passageways 41 and 21, such as, for example, when transferring fuel from the storage tank to the tanker truck.

Returning means 70 comprises reservoir 72 formed in body 42 of coupler 40 for collecting fuel residue that accumulates on the end faces 32 and 62 of poppets 30 and 60, respectively, during transfer operations. The orientation of coupler 40 relative to the ground is fixed by a transfer hose support arm (not shown). The support arm supports coupler 40 with reservoir 72 positioned at a circumferential location on the coupler such that the fuel residue drains vertically into the reservoir under the influence of gravity. The orientation of adapter 20 relative to coupler 40 is fixed only to the extent that handle 38 is accessible.

Figure 3:
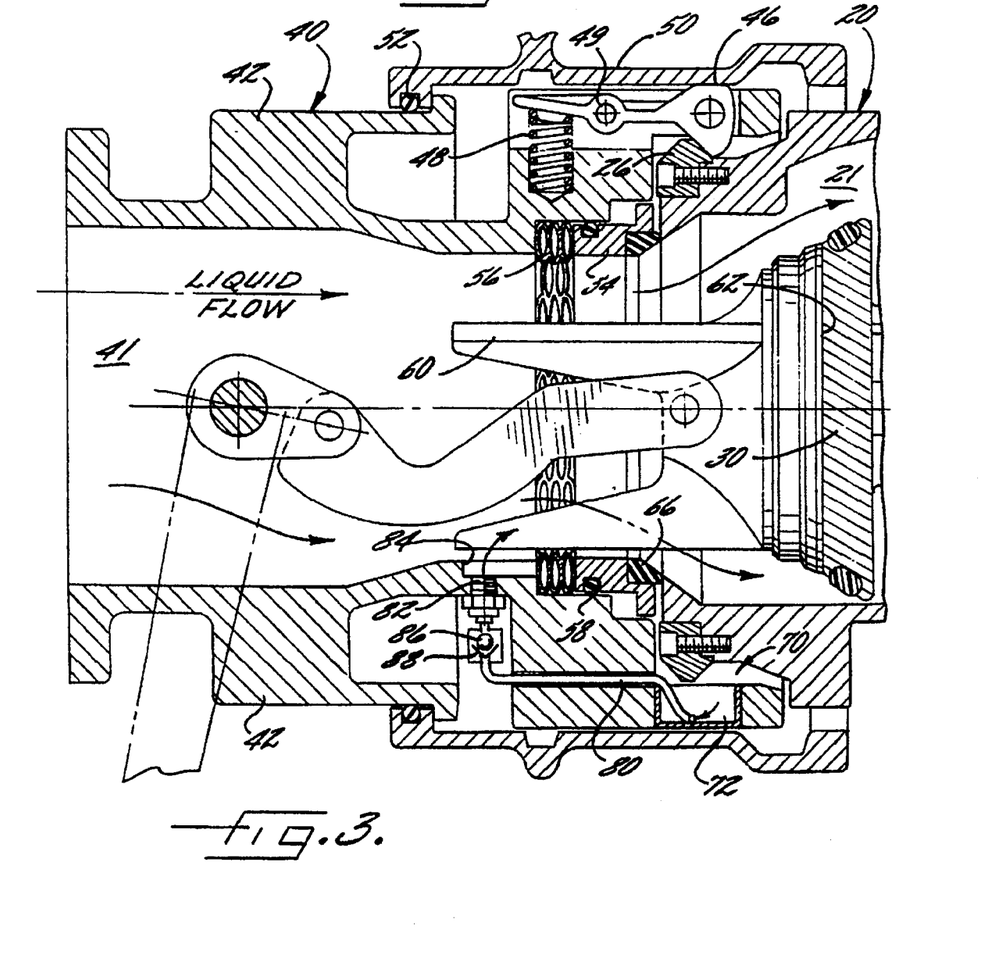
FIG. 3 is a sectional view of the coupler of the coupling of FIG. 1 showing the poppet of the coupler opened.

In a preferred embodiment shown in FIG. 3, returning means 70 further comprises a flexible tube 80 which extends between reservoir 72 and an opening 82 in body 42 of coupler 40 such that the reservoir is in fluid communication with flow passageway 41. Opening 82 is located opposite poppet 60 and adjacent a sharp edge 84 formed in body 42. A ball check valve 86 is positioned against a valve seat 88 to prevent fuel in flow passageway 41 from flowing through tube 80 in the direction of reservoir 72.

As illustrated in FIG. 3, when poppet 60 is opened, a continuous flow path is formed between the storage tank and the tanker truck. Fuel flows through flow passageway 41 past opening 82. Poppet 60 forms a small cross sectional area with the inner surface of body 42 in flow passageway 41. As the fuel flows past edge 84 over opening 82 its velocity increases and its pressure decreases according to the well known venturi effect. As a result, a vacuum is drawn on reservoir 72 and the fuel residue in the reservoir is suctioned through tube 80 into flow passageway 41. Thus, the fuel residue that accumulates on the end faces 32 and 62 of the poppets 30 and 60, respectively, is returned to the flow path. Although the fuel residue is returned to flow passageway 41 in the illustrated embodiments, the fuel residue may be routed to an external reservoir, such as a sludge tank.

Figure 4:
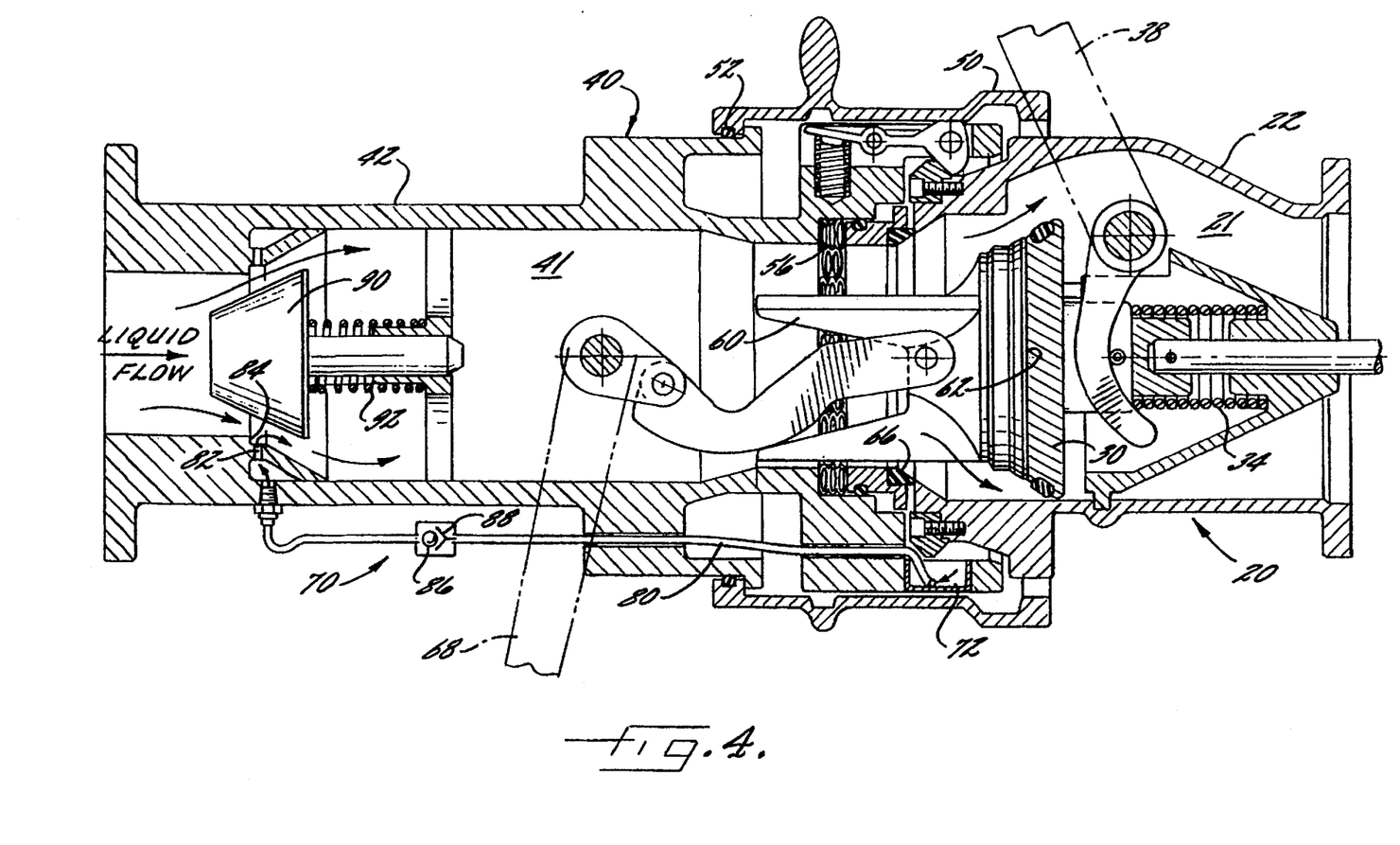
FIG. 4 is a sectional view of an alternative embodiment of a dry disconnect coupling according to the invention showing the adapter attached to the coupler and the poppets of the adapter and the coupler opened.

In a preferred embodiment shown in FIG. 4, the coupler 40 further comprises a backflow poppet valve 90 biased by a spring 92 against the inner surface of body 42 for sealing flow passageway 41 when fuel is not being transferred. As illustrated, body 42 is preferably elongated to accommodate poppet 90. Coupler 40 may, however, comprise a coupler body extension (not shown) attached to and positioned between flange 44 and transfer hose 12 of the storage tank.

During transfer operations (as shown), poppet 90 is held opened under the influence of the flow pressure of the fuel. Opening 82 is located opposite poppet 90 and adjacent a sharp edge 84 formed in body 42. When poppet 90 is opened, a backflow pressure is created on the upstream side of the poppet which increases the velocity of the flow past edge 84 and over opening 82. As a result of the venturi effect, a vacuum is drawn on reservoir 72 such that the fuel residue in the reservoir is returned through tube 80 to the flow path.

Figure 5:
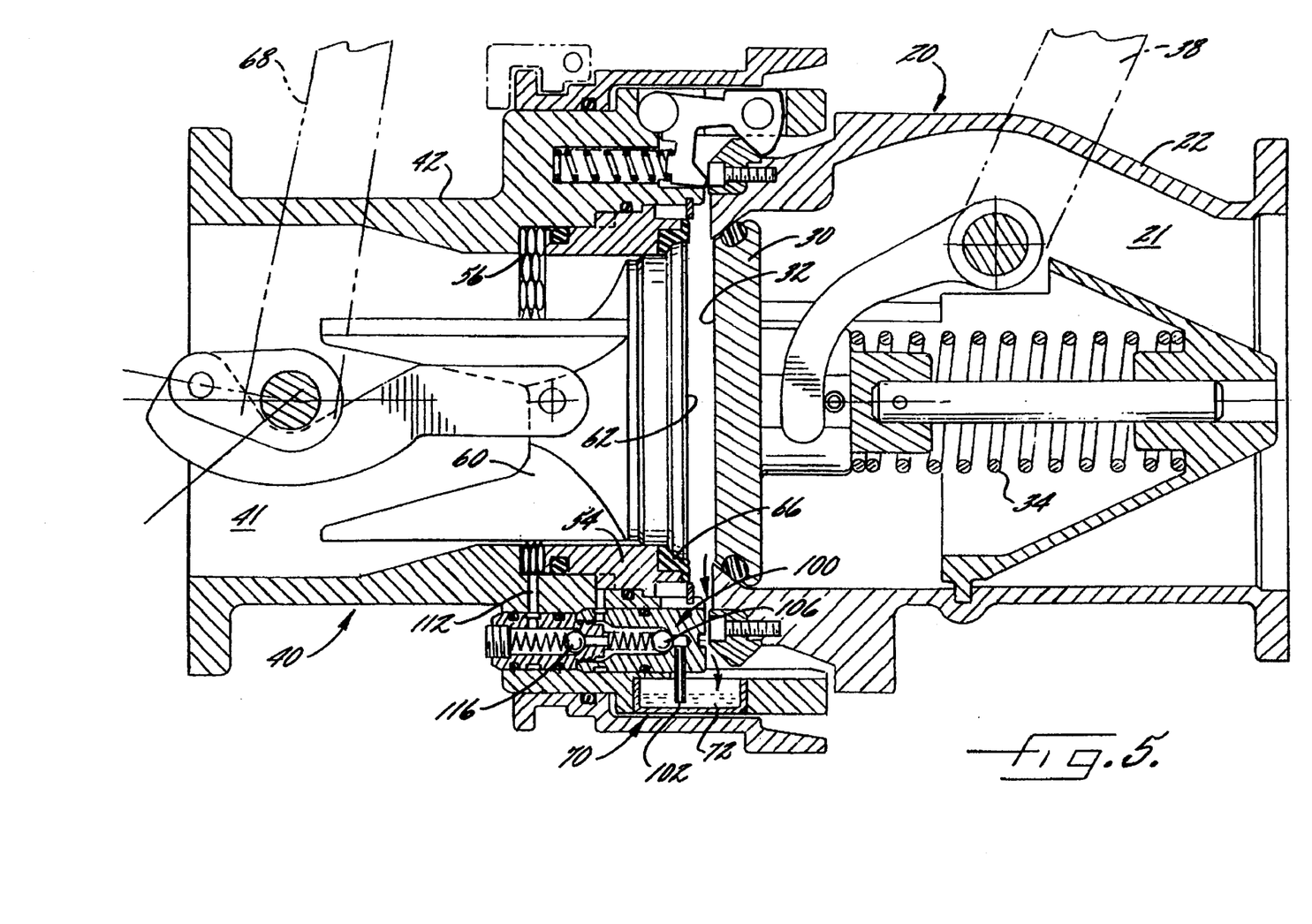
FIG. 5 is a sectional view of an alternative embodiment of a dry disconnect coupling according to the invention showing the adapter attached to the coupler and the poppets of the adapter and the coupler closed.
Figure 6:
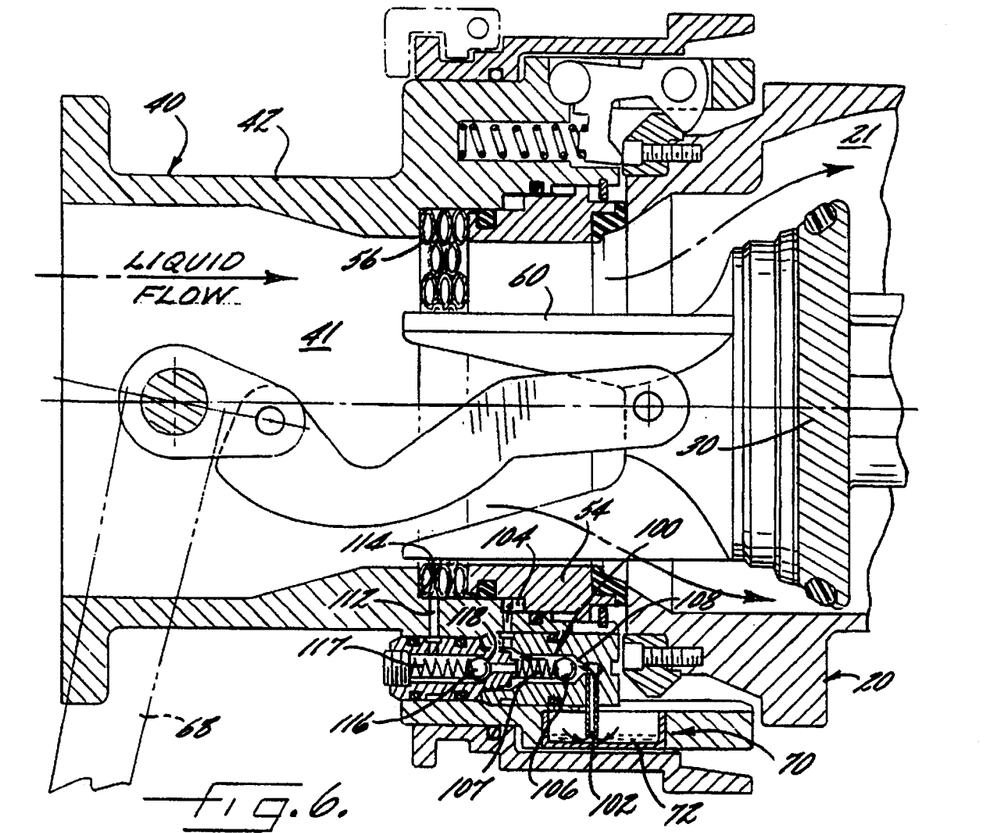
FIG. 6 is a sectional view of the coupler of o the coupling of FIG. 5 showing the poppet of the coupler opened.
Figure 7:
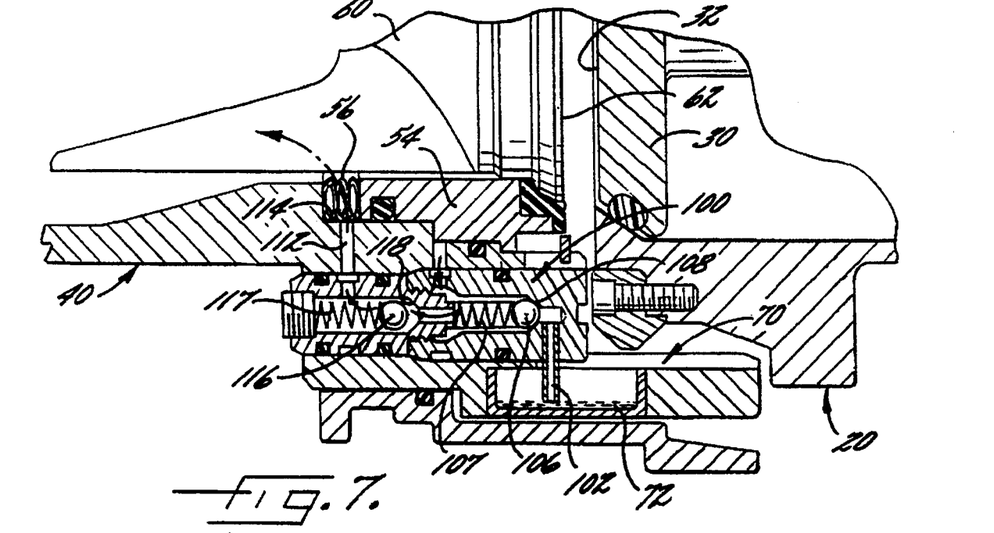
FIG. 7 is a detailed sectional view of the coupler of the coupling of FIG. 6 showing the poppet of the coupler closed.

In a preferred embodiment shown in FIGS. 5–7, returning means 70 further comprises means 100 for aspirating the fuel residue from reservoir 72 and for pumping the fuel residue into flow passageway 41. Aspirating and pumping means 100 comprises a rigid tube 102 which extends outwardly from reservoir 72 in the direction of an annular holding chamber 104 (FIG. 6) such that the reservoir is in fluid communication with the holding chamber. A ball check valve 106 is biased by a spring 107 against a valve seat 108 to prevent fuel from flowing out of chamber 104 past check valve 106 through tube 102 in the direction of reservoir 72.

Aspirating and pumping means 100 further comprises a rigid tube 112 which extends inwardly from an opening 114 in body 42 in the direction of chamber 104 such that the chamber is in fluid communication with flow passageway 41 of coupler 40. A ball check valve 116 is biased by a spring 117 against a valve seat 118 to prevent fuel from flowing out of flow passageway 41 through tube 112 past check valve 116 in the direction of chamber 104.

When poppet 60 is opened, for example, before a transfer operation, ring 54 moves forward under the influence of wave spring 56 with the poppet in the direction of adapter 20 as previously described. As shown in FIG. 6, the forward movement of ring 54 creates a vacuum in chamber 104 as it is opened. Consequently, the fuel residue in reservoir 72 is suctioned through tube 102 past check valve 106 and into chamber 104. When poppet 60 is closed, for example, after a transfer operation, ring 54 moves rearward with the poppet. As shown in FIG. 7, the rearward movement of ring 54 pumps the fuel residue out of chamber 104 as it is closed. The fuel residue in chamber 104 is pumped past check valve 116 through tube 112 into flow passageway 41 such that the fuel residue is returned to the flow path.

Obviously, many alternative embodiments of the invention are within the ordinary skill of those skilled in the art. Therefore, it is not intended that the invention be limited to the preceding description of illustrative preferred embodiments, but rather that all embodiments within the spirit and scope of the invention disclosed and claimed herein be included.

That which is claimed is:

1. A coupling for connecting a first fluid conduit to a second fluid conduit to form a continuous flow path, said coupling comprising
   an adapter comprising
      a generally cylindrical adapter body having opposed ends and defining an adapter flow passageway therethrough, one of the opposed ends of said adapter body attached to the first fluid conduit; and
      adapter valve means positioned within the adapter flow passageway for controlling flow of fluid through said adapter body, said adapter valve means comprising an outwardly facing end face adjacent the other opposed end of said adapter body;
   a coupler comprising
      a generally cylindrical coupler body having opposed ends and defining a coupler flow passageway therethrough, one of the opposed ends of said coupler body attached to the second fluid conduit; and
      coupler valve means positioned within the coupler flow passageway for controlling flow of fluid through said coupler body, said coupler valve means comprising an outwardly facing end face adjacent the other opposed end of said coupler body;
   means releasably connecting the other opposed end of said adapter body to the other opposed end of said coupler body such that the end face of the adapter valve means opposes the end face of the coupler valve means; and
   venturi vacuum means for returning fluid residue that accumulates on the end faces of said adapter valve means and said coupler valve means to the flow path.

2. A coupling according to claim 1 wherein said venturi vacuum means comprises a reservoir formed in said coupler body adjacent said adapter body for collecting the fluid residue from the end faces of said adapter valve means and said coupler valve means.

3. A coupling according to claim 2 wherein said venturi vacuum means further comprises a tube extending between said reservoir and an opening in said coupler body such that said reservoir is in fluid communication with the coupler flow passageway.

4. A coupling according to claim 3 wherein said coupler valve means and the inner surface of said coupler body define an area having a small cross section and wherein said opening is located opposite said coupler valve means and adjacent a sharp edge formed in said coupler body such that when fluid flows past said edge and over said opening a vacuum is created to suction the fluid residue collected in said reservoir through said tube into the flow path.

5. A coupling according to claim 3 wherein said venturi vacuum means further comprises a check valve within said tube adjacent said opening for preventing fluid from flowing out of the coupler flow passageway in the direction of said reservoir.

6. A coupling according to claim 5 wherein said check valve comprises a ball biased against a valve seat when said coupler valve means is closed.

7. A coupling according to claim 3 wherein said coupler further comprises a poppet valve positioned within the coupler flow passageway, said poppet valve and the inner surface of said coupler body defining an area having a small cross section, and wherein said opening is located opposite said poppet valve and adjacent a sharp edge formed in said coupler body such that when fluid flows past said edge and over said opening a vacuum is created to suction the fluid residue collected in said reservoir through said tube into the flow path.

8. A coupling according to claim 7 wherein said poppet valve is biased by a spring against the flow of fluid through the coupler flow passageway.

9. A coupling according to claim 7 wherein said venturi vacuum means further comprises a check valve within said tube adjacent said opening for preventing fluid from flowing out of the coupler flow passageway in the direction of said reservoir.

10. A coupling according to claim 9 wherein said check valve comprises a ball biased against a valve seat when said poppet valve is closed.

11. A coupler for a fluid coupling comprising
a generally cylindrical body having opposed ends and defining a flow passageway therethrough;
valve means positioned within the flow passageway for controlling flow of fluid through said body, said valve means comprising an outwardly facing end face adjacent one of the opposed ends; and
venturi vacuum mean for returning fluid residue that accumulates on the end face of said valve means to the, flow passageway defined by said body, said returning means comprising
a reservoir formed in said body adjacent the end face of said valve means for collecting the fluid residue that accumulates on the end face; and
a tube ending between said reservoir and an opening in said body such that said reservoir is in fluid communication with the flow passageway;
wherein said valve means and the inner surface of said body define an area having a small cross section and wherein said opening is located opposite said valve means and adjacent a sharp edge formed in said body such that when fluid flows past said edge and over said opening a vacuum is created to suction the fluid residue collected in said reservoir through said tube into the flow passageway.

12. A coupler according to claim 11 wherein said venturi vacuum means further comprises a check valve within said tube adjacent said opening for preventing fluid from flowing out of the flow passageway in the direction of said reservoir.

13. A coupler according to claim 12 wherein said check valve comprises a ball biased against a valve seat when said valve means is closed.

14. A coupler according to claim 11 further comprising a poppet valve positioned within the flow passageway, said poppet valve and the inner surface of said body defining an area having a small cross section, and wherein said opening is located opposite said poppet valve and adjacent a sharp edge formed in said body such that when fluid flows past said edge and over said opening a vacuum is created to suction the fluid residue collected in said reservoir through said tube into the flow passageway.

15. A coupler according to claim 14 wherein said poppet valve is biased by a spring against the flow of fluid through the flow passageway.

16. A coupler according to claim 14 wherein said venturi vacuum means further comprises a check valve within said tube adjacent said opening for preventing fluid from flowing out of the flow passageway in the direction of said reservoir.

17. A coupler according to claim 16 wherein said check valve comprises a ball biased against a valve seat when said poppet valve is closed.

18. A coupler for a fluid coupling comprising
a generally cylindrical body having opposed ends and defining a flow passageway therethrough;
valve means positioned within the flow passageway for controlling flow of fluid through said body, said valve means comprising an outwardly facing end face adjacent one of the opposed ends; and
aspirating and pumping means for returning fluid residue that accumulates on the end face of said valve means to the flow passageway defined by said body, said aspirating and pumping means comprising
reservoir formed in said body adjacent the end face of said valve means for collecting the fluid residue that accumulates on the end face;
a generally cylindrical seal ring positioned between said valve means and said body, said seal ring being movable with said valve means relative to said body;
spring means for biasing said seal ring against said valve means;
an annular holding chamber formed between said seal ring and said body when said seal ring moves forwardly with said valve means;
a first one-way flow passage extending from said reservoir to said holding chamber; and
a second one-way flow passage extending from said holding chamber to the flow passageway;
whereby the fluid residue is suctioned out of said reservoir through said first flow passage and into said holding chamber when said seal ring moves forwardly with said valve means and the fluid residue is pumped from said holding chamber through said second flow passage and into the flow passageway when said seal ring moves rearwardly with said valve means.

19. A coupler according to claim 18 wherein said first flow passage comprises
an aspiration passageway extending between said reservoir and said holding chamber; and
a first check valve disposed within said aspiration passageway for preventing fluid from flowing out of said holding chamber in the direction of said reservoir.

20. A coupler according to claim 19 wherein said first check valve comprises
a first ball;
a first valve seat; and
a first spring for biasing said first ball against said first valve seat.

21. A coupling according to claim 18 wherein said second flow passage comprises a pumping passageway extending between said holding chamber and the flow passageway; and a second check valve disposed within said pumping passageway for preventing fluid from flowing out of the flow passageway in the direction of said holding chamber.

22. A coupler according to claim 21 wherein said second check valve comprises a second ball;

a second valve seat; and a second spring for biasing said second ball against said second valve seat.

23. A coupling for connecting a first fluid conduit to a second fluid conduit to form a continuous flow path, said coupling comprising an adapter comprising a generally cylindrical adapter body having opposed ends and defining an adapter flow passageway therethrough, one of the opposed ends of said adapter body attached to the first fluid conduit; and adapter valve means positioned within the adapter flow passageway for controlling flow of fluid through said adapter body, said adapter valve means comprising an outwardly facing end face adjacent the other opposed end of said adapter body;

a coupler comprising a generally cylindrical coupler body having opposed ends and defining a coupler flow passageway therethrough, one of the opposed ends of said coupler body attached to the second fluid conduit; and coupler valve means positioned within the coupler flow passageway for controlling flow of fluid through said coupler body, said coupler valve means comprising an outwardly facing end face adjacent the other opposed end of said coupler body;

means releasably connecting the other opposed end of said adapter body to the other opposed end of said coupler body such that the end face of the adapter valve means opposes the end face of the coupler valve means; and aspirating and pumping means for returning fluid residue that accumulates on the end faces of said adapter valve means and said coupler valve means to the flow path, said aspirating and pumping means comprising a reservoir formed in said coupler body adjacent said adapter body for collecting the fluid residue from the end faces of said adapter valve means and said coupler valve means, said aspirating and pumping means alternatively aspirating the fluid residue out of said reservoir and pumping the fluid residue aspirated out of said reservoir into the flow path.

24. A coupling according to claim 23 wherein said aspirating and pumping means comprises a generally cylindrical seal ring positioned between said coupler valve means and said coupler body, said seal ring being movable with said coupler valve means relative to said coupler body;

spring means for biasing said seal ring in the direction of said adapter body and against said coupler valve means;

an annular holding chamber formed between said seal ring and said coupler body when said seal ring moves with said coupler valve means in the direction of said adapter body;

a first one-way flow passage extending from said reservoir to said holding chamber; and a second one-way flow passage extending from said holding chamber to the coupler flow passageway;

whereby the fluid residue is suctioned out of said reservoir through said first flow passage and into said holding chamber when said seal ring moves with said coupler valve means in the direction of said adapter body and the fluid residue is pumped from said holding chamber through said second flow passage and into the coupler flow passageway when said seal ring moves with said coupler valve means in the direction of said coupler body.

25. A coupling according to claim 24 wherein said first flow passage comprises an aspiration passageway extending between said reservoir and said holding chamber; and a first check valve disposed within said aspiration passageway for preventing fluid from flowing out of said holding chamber in the direction of said reservoir.

26. A coupling according to claim 25 wherein said first check valve comprises a first ball;

a first valve seat; and a first spring for biasing said first ball against said first valve seat.

27. A coupling according to claim 24 wherein said second flow passage comprises a pumping passageway extending between said holding chamber and the coupler flow passageway; and a second check valve disposed within said pumping passageway for preventing fluid from flowing out of the coupler flow passageway in the direction of said holding chamber.

28. A coupling according to claim 27 wherein said second check valve comprises a second ball;

a second valve seat; and a second spring for biasing said second ball against said second valve seat.

* * * * *